UNITED STATES PATENT OFFICE.

JUSTUS WOLFF, OF ALBANY, NEW YORK, ASSIGNOR TO THE ALBANY ANILINE AND CHEMICAL WORKS, OF SAME PLACE.

PRODUCTION OF COLORING-MATTERS FROM DIAZOAMIDO COMPOUNDS.

SPECIFICATION forming part of Letters Patent No. 277,182, dated May 8, 1883.

Application filed October 30, 1882. (Specimens.)

*To all whom it may concern:*

Be it known that I, JUSTUS WOLFF, a citizen of Great Britain, residing at Albany, in the county of Albany and State of New York, have invented certain new and useful Improvements in the Production of Coloring-Matters by Means of Diazoamido Compounds, of which the following is a specification.

My invention relates to the production of a scarlet coloring-matter or dye-stuff; and it consists in combining a sulpho-conjugation of a diazoamido compound with a naphthol-disulphonate.

In order to carry out my invention, I proceed as follows: I produce diazoxylol chloride in the usual way—for example, by the action of one equivalent of sodium nitrite in aqueous solution on a solution containing one equivalent of xylidine and two equivalents of hydrochloric acid at a low temperature. To the solution thus obtained containing diazoxylol chloride I add, while cold, a solution of one equivalent of amidobenzol sulphonate of ammonia, thereby forming diazoxylolamidobenzol sulphonate of ammonia in solution. This I do not claim as new, as the diazoamido compounds are usually made in this manner. The solution of diazoxylolamidobenzol sulphonate of ammonia I add directly, while cold, to a solution of betanaphtholdisulphonate of sodium, agitation being kept up. The liquid thus obtained contains the coloring-matter which is the object of my invention, and which results from the reaction of the betanaphthol disulphonate of sodium and the diazoxylolamidobenzol sulphonate of ammonia. The coloring-matter contained in the above liquid is precipitated with common salt, filtered and dried, and contains in its molecule the combination of the diazoxylol with the amidobenzol sulphonate, forming the diazoxylolamidobenzol sulphonate in combination with the betanaphthol disulphonate of sodium. Thus it will be seen that my coloring-matter contains besides the diazo compound the amidobenzol-sulphonate compound with the betanaphthol disulphonate.

Upon a like principle other colors may be produced, for which I intend to make further applications.

What I claim as new, and desire to secure by Letters Patent, is—

1. The herein-described process for producing scarlet coloring-matter, which consists in mixing a solution of diazoxylolamidobenzol sulphonate of ammonia with a solution of sodium betanaphthol disulphonate, and afterward precipitating the coloring-matter thus obtained with salt and filtering and drying the same.

2. The scarlet coloring-matter produced by the process herein set forth.

In testimony whereof I affix my signature in presence of two witnesses.

JUSTUS WOLFF.

Witnesses:
H. K. LANSING,
C. L. FRINK.